May 19, 1970   L. D. KLEISS   3,512,394
TEMPERATURE AND COMPOSITIONS DEPENDENT PROPERTY MEASURING
Filed Oct. 25, 1967   2 Sheets-Sheet 2

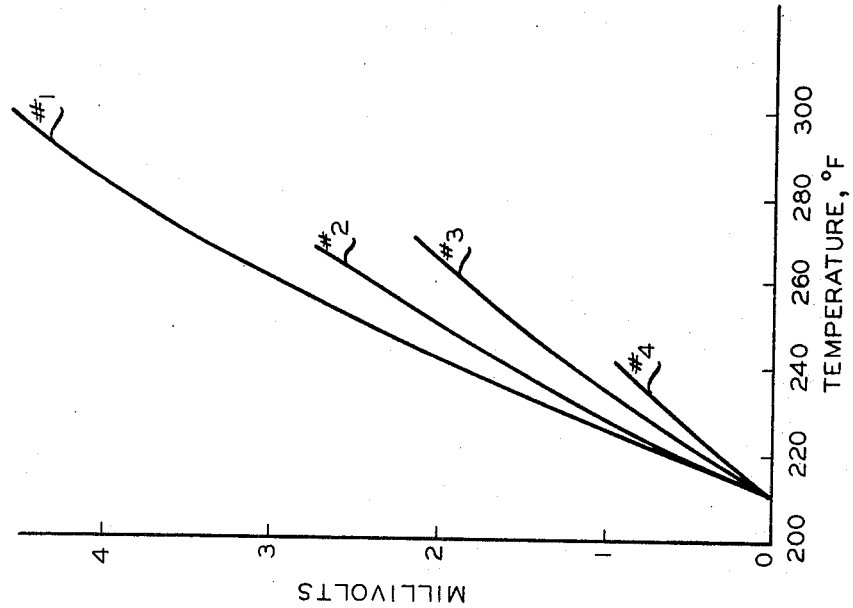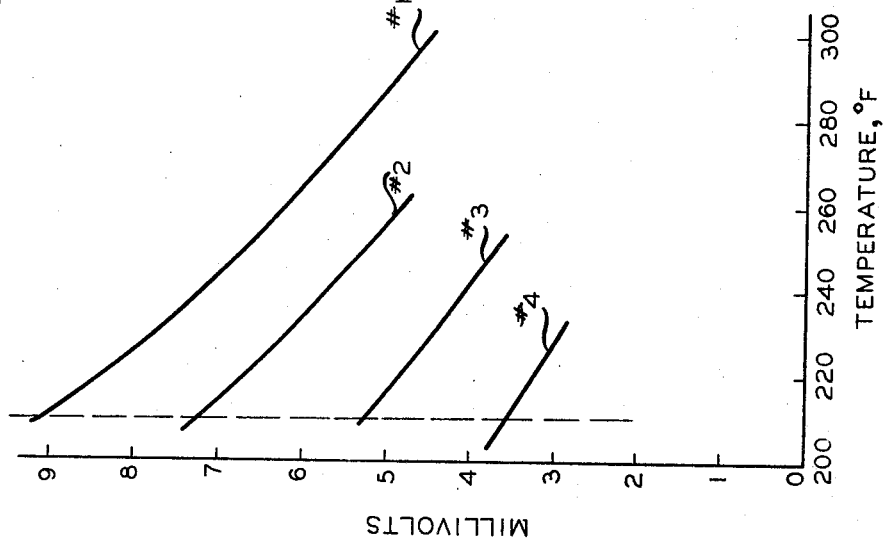

INVENTOR.
L. D. KLEISS
BY *Young & Quigg*
ATTORNEYS

United States Patent Office 3,512,394
Patented May 19, 1970

3,512,394
TEMPERATURE AND COMPOSITION DEPENDENT PROPERTY MEASURING
Louis D. Kleiss, Borger, Tex., assignor to Phillips Petroleum Company, a corporation of Delaware
Filed Oct. 25, 1967, Ser. No. 678,089
Int. Cl. G01n 11/00
U.S. Cl. 73—54                                  10 Claims

ABSTRACT OF THE DISCLOSURE

A property of multicomponent material which is dependent on composition is referenced to a predetermined temperature. In a particular embodiment a viscometer produces a first signal representative of a measurement of the viscosity, while a temperature compensating circuit produces a second signal representative of the difference between the predetermined reference temperature and the temperature at which the measurement is made. A composition compensating device produces a third signal representative of a function of a fourth signal which is representative of the viscosity at the predetermined reference temperature of the material under test. A fifth signal representative of the composite of the temperature correction and the composition correction for the property is produced as a function of the second signal and the third signal. The first and fifth signals are added to obtain said fourth signal.

BACKGROUND OF THE INVENTION

Some measurements, for example viscosity, density, refractive index, and gas flow rate, are useful in specifying the condition only when referenced to a predetermined fixed temperature, called a reference temperature. While the present invention is applicable to the measurements of any of these conditions, for purpose of simplicity, it will be described in terms of a measurement of viscosity.

The viscosity of an asphalt is a function of temperature. Generally, the viscosity of an asphalt is referenced back to a certain temperature, for example, 210° F. In copending application Ser. No. 478,862, filed Aug. 11, 1965, there is disclosed a method and apparatus for obtaining a temperature compensated measurement of viscosity for an asphalt. The measurement is obtained by adding a signal from the viscosimeter and a signal representative of the temperature correction required. The latter signal, which is a function of temperature, represents the difference between the viscosity of a given asphalt at the measured temperature and the viscosity of said given asphalt at the predetermined reference temperature, said given asphalt being at least substantially similar to the asphalt being measured.

This asphalt measuring system works well as long as the type of asphalt remains substantially constant. However, as shown in FIG. 1, the relationship between the output reading from the viscosimeter and the temperature at which the measurement is made varies as a function of the composition of the asphalt. The viscometer output voltage versus temperature curves of FIG. 1 for asphalt samples #1, #2, #3 and #4 were obtained with a Dynatrol viscosimeter which produces an output voltage which is related to the logarithm of the measured viscosity. Further, as shown in FIG. 2, different corrections are required for the different asphalt compositions of samples #1, #2, #3 and #4 at a given measurement temperature to correct the measured viscosity reading back to the reference temperature. Thus, the viscosity of an asphalt at a certain reference temperature is a function of the measured viscosity, the temperature at which the viscosity of the asphalt is measured and the composition of the asphalt. In other words, the correction required to reference as viscosity measurement back to a given reference temperature is dependent on asphalt composition as well the the measurement temperature. The asphalt composition variable is one which has heretofore been manually set on the recording instrument.

In said copending application a suitable switching system is disclosed by which switching system different viscosity asphalts, i.e., different composition asphalts, can be measured. In the copending application, the operator must know what type of asphalt is being tested in order to add in the appropriate factor. In the event that the operator should misunderstand the nature of the asphalt or forget to switch the instrument, an erroneous reading will take place. It will appear that the asphalt is off specification when, in fact, it is on specification, and vice versa.

SUMMARY OF THE INVENTION

I have now discovered that the compensation for the type of asphalt can automatically be made by providing a relationship between the voltage input to the recording instrument and the composition correction for the measured viscosity. In other words, the voltage correction for the type of asphalt is a function of the voltage input to the recorder. This discovery is based on the fact that there is a functional relationship between the correction required for different composition asphalts and the viscosity of the asphalt at these different compositions.

By various aspects of this invention, one or more of the following or other objects can be obtained.

It is an object of this invention to provide an improved device for measuring a property of a substance which is affected by temperature and composition.

It is another object of this invention to provide an improved device for measuring the viscosity of an asphalt wherein the viscosity of the asphalt is referenced back to a given reference temperature and wherein the temperature correction to the measurement signal is automatically compensated for variations in the composition of the asphalt.

It is still a further object of this invention to provide an improved method for measuring a property of a substance which is dependent on temperature and composition.

It is yet another object of this invention to provide an improved method for measuring viscosity of an asphalt wherein error, due to a change in the type of asphalt, is automatically avoided.

Other aspects, objects, and the several advantages of this invention are apparent to one skilled in the art from a study of this disclosure, the drawings, and the appended claims.

According to the invention, the property of a multicomponent material, which property is dependent on composition and temperature, is referenced to a predetermined temperature, by a method wherein a first signal representative of a function of a measurement of the property and a second signal representative of a function of the difference between the predetermined reference temperature and the measurement temperature of the material are established. A third signal is produced representative of a function of a fourth signal, which is representative of the property at the predetermined reference temperature of the material being measured. The second and third signals are combined to produce a fifth signal representative of the required temperature and composition correction for the property measurement. The first and fifth signals are added together to obtain the fourth signal.

Further according to the invention, there is provided apparatus for measuring the property of a multicomponent material, which property is dependent on the composition and temperature of said material. The apparatus comprises a measuring device, for example a viscometer, to generate a first signal representative of a function of the measured property. A temperature compensating circuit generates a second signal representative of a function of the difference between a predetermined reference temperature and the temperature at which the property of the material was measured. A composition compensating device establishes a third signal representative of a function of a fourth signal. Means is provided to combine the second and third signals to generate a fifth signal representative of the composition compensated temperature correction required for the first signal. An adder adds the fifth signal to the first signal to produce the fourth signal.

BRIEF DESCRIPTION OF THE DRAWINGS

The invention will now be described with reference to the accompanying drawings in which FIG. 1 is a graphical representation of the relationship between the viscosimeter output signal representing measured viscosity and the temperature at which the measurement is made, for several asphalts having different composition; FIG. 2 is a graphical representation of the relationship between the magnitude of the compensating signal and the measurement temperature for various asphalts of different compositions.

DESCRIPTION OF A PREFERRED EMBODIMENT

Figure 3:
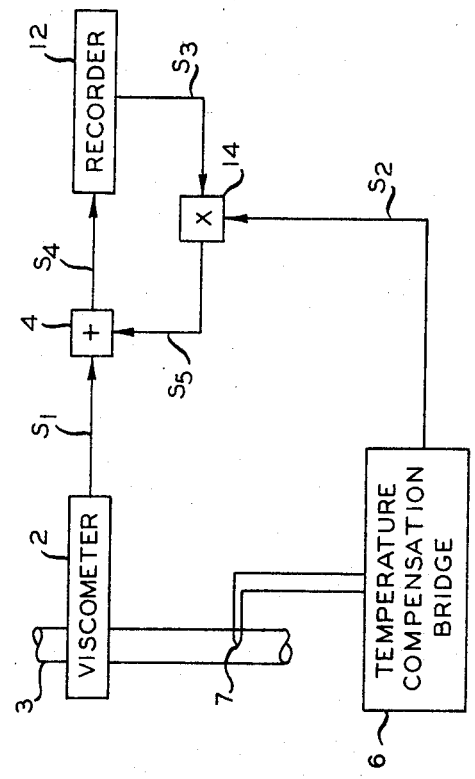
FIG. 3 is a block diagram of a viscosity measuring system in accordance with the invention.

Referring now to FIG. 3, a viscosimeter 2 measures the viscosity of an asphalt, for example, flowing in a conduit 3 and the viscosimeter 2 produces a first voltage signal, $S_1$, representative of a function of the measured viscosity of the asphalt. The first signal is applied to one input of algebraic adder 4. The temperature compensating bridge means 6 measures the temperature of the asphalt at the point where the viscosity is measured by means of thermocouple 7 and produces a second, current signal, $S_2$, representative of a function of the difference between the measurement temperature and the predetermined reference temperature. The differential temperature current signal, $S_2$, is then multiplied by a variable resistance signal, $S_3$, in multiplier 14 to produce a composition compensated temperature correction voltage signal, $S_5$, representative of the required temperature compensation. The value of resistance signal, $S_3$, is mechanically manipulated by recorder 12 as a function of the signal, $S_4$, applied to an input of recorder 12. The output from multiplier 14 is applied to a second input of algebraic adder 4.

The output, $S_4$, of adder 4 is proportional to the algebraic sum of the composition compensated temperature compensation voltage signal, $S_5$, and the output of viscosimeter 2 and is thus representative of the viscosity of the asphalt referenced to the reference temperature. The output of adder 4 is applied to an input of recorder 12.

Figure 4:
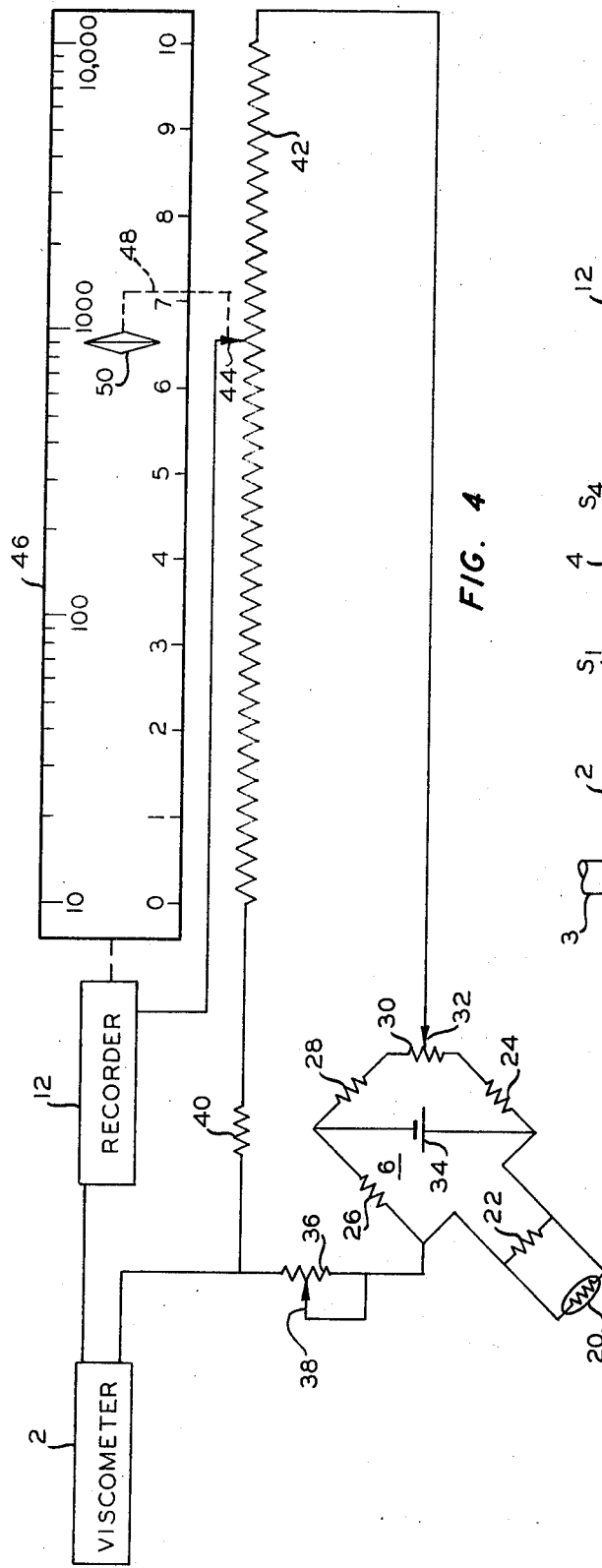
FIG. 4 is a schematic representation of a presently preferred embodiment of the system of FIG. 3 as applied to a means for measuring the viscosity of asphalt.

Referring now to FIG. 4, a thermistor unit 20, connected in parallel with resistor 22, produces a non-linear resistance in a bridge circuit 6 representative of the temperature at which the viscosity measurement is made by viscosimeter 2. The bridge circuit 6 is composed of the thermistor 20, resistors 22, 24, 26 and 28, a source of potential 34 and a potentiometer 30. The contactor 32 of potentiometer 30 is adjustable to zero or balance the bridge circuit. The current output, $S_2$, of the bridge circuit 6 passes through a span resistor 36 with slidable contact 38 to adjust the span of the bridge circuit 6. The output from the bridge circuit further is connected through potentiometer 42 and fixed resistor 40. The voltage across resistor 40 and part of potentiometer 42 as determined by slidable contact 44 is added to the voltage signal from the viscosimeter and recorded in recorder 12. Recorder 12 has a chart 46 on which the measured viscosity corrected for temperature and composition can be read. Chart 46 has a pointer 50 which moves up and down the scale in accordance with the magnitude of the input voltage signal to recorder 12. In a particular embodiment utilizing a Dynatrol viscosimeter, the chart has a logarithmic scale from which the viscosity at the reference temperature of the measured material can be read. Pointer 50 is attached to potentiometer contactor 44 through mechanical connection 48. Thus, as pointer 50 moves up and down the scale on chart 46, contactor 44 will move up and down the potentiometer 42 thereby changing the value of the total resistance represented by resistor 40 and the portion of potentiometer 42 between resistor 40 and contactor 44. This change in resistance signal, $S_3$, results in a corresponding change in the value of the voltage signal from the temperature correction circuit which is added to the output of viscosimeter 2.

The invention can further be explained with reference to the following derivation. As mentioned hereinbefore, the viscosity of the material such as asphalt referenced to a given temperature is a function of the measured or apparent viscosity, the temperature at which the viscosity is measured, the reference temperature, and the composition of the asphalt. This can be explained mathematically as follows:

$$\text{Viscosity} = f(V_a, T_m, T_r, C) \quad (1)$$

where $V_a$ is the measured viscosity, $T_m$ is the temperature at which the viscosity is measured, $T_r$ is the reference temperature, and C is the composition of the asphalt.

Referring to FIG. 2, the voltage from the viscosimeter representative of the viscosity of an asphalt at a given reference temperature can be expressed as follows:

$$V_r = V_a + f(T_m - T_r, C) \quad (2)$$

wherein $V_r$ is equal to the voltage representative of the true viscosity of the substance being measured referenced to a given temperature, $V_a$ is equal to the voltage representative of the apparent or measured viscosity, $$f(T_m - T_r, C)$$

is equal to the voltage representative of the composition compensated temperature correction.

Thus, as can be seen, there are three unknowns. The apparent viscosity can be measured and the temperature correction $T_m - T_r$ can be measured. According to the invention the third variable is found due to the discovery that the composition compensation for the temperature correction is a function of the total viscosity signal (the signal representing the viscosity of the reference temperature of the asphalt being measured). This can be expressed as follows:

$$f(T_m - T_r, C) = f(T_m - T_r) \cdot f(V_r) \quad (3)$$

Thus, by substituting Equation 3 in Equation 2, $$V_r = V_a + f(T_m - T_r) \cdot f(V_r) \quad (4)$$

The number of unknowns is reduced to two. Equation 4 can be solved for $V_r$ using two measurements, where previously these two measurements plus a knowledge of composition were required.

Using the viscosity measurement of asphalt with a Dynatrol viscometer as an example in applying Equation 4, the experimental data in FIG. 2 shows that the term, $f(V_r)$, is linear, since curves 2, 3, and 4 are always fixed fractions of Curve #1. Since $f(V_r)$ is linear.

$$f(V_r) = R_b + K V_r \quad (5)$$

where $R_b$ and $K$ are constants. Substituting this in Equation 4, the equation for the Dynatrol viscometer becomes, $$V_r = V_a + [f(T_m - T_r)](R_b + KV_r) \quad (6)$$

Equation 6 is solved by the apparatus of FIG. 4. An electrical current equivalent to $f(T_m - T_r)$ is generated by bridge circuit 6 and span resistor 36. This current passed through a fixed resistor 40 and linear slidewire 42, generating a voltage, according to Ohm's law. The distance between the lower end of slidewire 42 and contactor 44 is proportional to $V_r$. $K$ is a scaling factor relating this distance to ohms of resistance. Resistor 40 equals $R_b$. Thus the voltage existing between the left side of resistor 40 and contactor 44 represents the term, $[f(T_m - T_r)](R_b + KV_r)$. This voltage is added to the viscometer signal, $V_a$, at the recorder input, and the viscometer signal is thus compensated for deviations from a reference temperature, $T_r$.

In the description of the specific embodiment of the invention, the term $f(V_r)$ is linear. While this linearity holds for asphalt measurement using a Dynatrol viscometer, it is not valid for all temperature compensations. If $f(V_r)$ is found to be non-linear, a non-linear slidewire 42 can be used to match the non-linearity of $f(V_r)$. Suitable non-linear slidewires can be secured from the Helipot Corporation, a division of Beckman Instruments, Inc.

Whereas, the description of the specific embodiment of my invention describes a type of electrical analog computing apparatus capable of solving Equation 4, of which Equation 6 is a special case, it is understood my invention is not so limited. Equation 4 may be mathematically manipulated into different forms, and may be solved by a variety of anolog and digital computing devices.

Whereas the invention has been described with reference to the measurement of viscosity of asphalt composition, it is to be understood that the invention can be employed in measuring different properties of other materials. For example, the density, refractive index, and dielectric constant of liquid or solid compositions can be measured and referenced back to a given temperature.

Reasonable variation and modification are possible within the scope of this disclosure without departing from the spirit thereof.

I claim:

1. A method for measuring a property of a multicomponent material which is dependent upon composition and temperature and referencing the measurement to a predetermined temperature, which comprises producing a first signal representative of a measurement of the property, producing as a temperature correction a second signal representative of the difference between the predetermined reference temperature and the temperature at which the measurement is made, producing as a composition correction a third signal representative of a function of a fourth signal which is representative of the property at the predetermined reference temperature of the material under test, producing responsive to said second and third signals a fifth signal representative of the composite of the temperature correction and the composition correction for the property, and adding the first and fifth signals to obtain said fourth signal representative of the property at the predetermined reference temperature of the material under test.

2. A method in accordance with claim 1 wherein said fifth signal is representative of the multiplication product of said second signal and said third signal.

3. A method in accordance with claim 2 wherein said property is viscosity.

4. A method in accordance with claim 3 wherein said material is asphalt.

5. A method in accordance with claim 4 wherein said third signal is a linear function of said fourth signal.

6. Apparatus for measuring a property of a multicomponent material, which property is dependent on the composition and temperature of said material, comprising means for measuring said property of said material and generating a first signal representative of a function of said measured property, means for measuring the temperature at which the measurement of said property was made and generating a second signal representative of a function of the difference between a predetermined reference temperature and the temperature at which said property of said material was measured, means for establishing a third signal representative of a function of a fourth signal, means responsive to said second signal and said third signal for generating a fifth signal representative of the composition compensated temperature correction required for the first signal, and means for adding said fifth signal to said first signal to produce said fourth signal.

7. Apparatus in accordance with claim 6 wherein said means for measuring said property comprises a viscosimeter.

8. Apparatus in accordance with claim 6 wherein said means for establishing a third signal comprises a potentiometer and means for adjusting the position of the contactor of said potentiometer in accordance with a function of said fourth signal, wherein said means for measuring the temperature comprises means for producing an electrical current representative of said second signal, and wherein said means for generating a fifth signal comprises means for passing said electrical current through said potentiometer to produce a voltage between said contactor and one end of said potentiometer.

9. Apparatus in accordance with claim 8 wherein said means for establishing a third signal further comprises a recorder, means for applying said fourth signal to an input of said recorder, and means connecting said contactor to said recorder to cause the movement of said contactor along said potentiometer responsive to variations in said fourth signal.

10. Apparatus in accordance with claim 9 wherein said means for measuring said property produces a voltage output, and wherein said means for adding comprises means for connecting the output of said means for measuring said property in series with one of said potentiometer and said contactor.

References Cited

UNITED STATES PATENTS

| 2,708,361 | 5/1955 | Boyle et al. | 73—59 |
| 2,837,913 | 6/1958 | Rich et al. | 73—59 |
| 3,090,222 | 5/1963 | Akaboshi et al. | 73—59 X |

FOREIGN PATENTS

| 889,942 | 1/1965 | U.S.S.R. | | |

LOUIS R. PRINCE, Primary Examiner

J. W. ROSKOS, Assistant Examiner

UNITED STATES PATENT OFFICE
CERTIFICATE OF CORRECTION

Patent No. 3,512,394　　　　　　　　Dated May 19, 1970

Inventor(s) Louis D. Kleiss

It is certified that error appears in the above-identified patent and that said Letters Patent are hereby corrected as shown below:

Column 6, line 50, after "one" insert -- end --.

Signed and sealed this 15th day of September 1970.

(SEAL)
Attest:

EDWARD M. FLETCHER, JR.　　　　　　WILLIAM E. SCHUYLER, JR.
Attesting Officer　　　　　　　　　Commissioner of Patents